Figure 1:
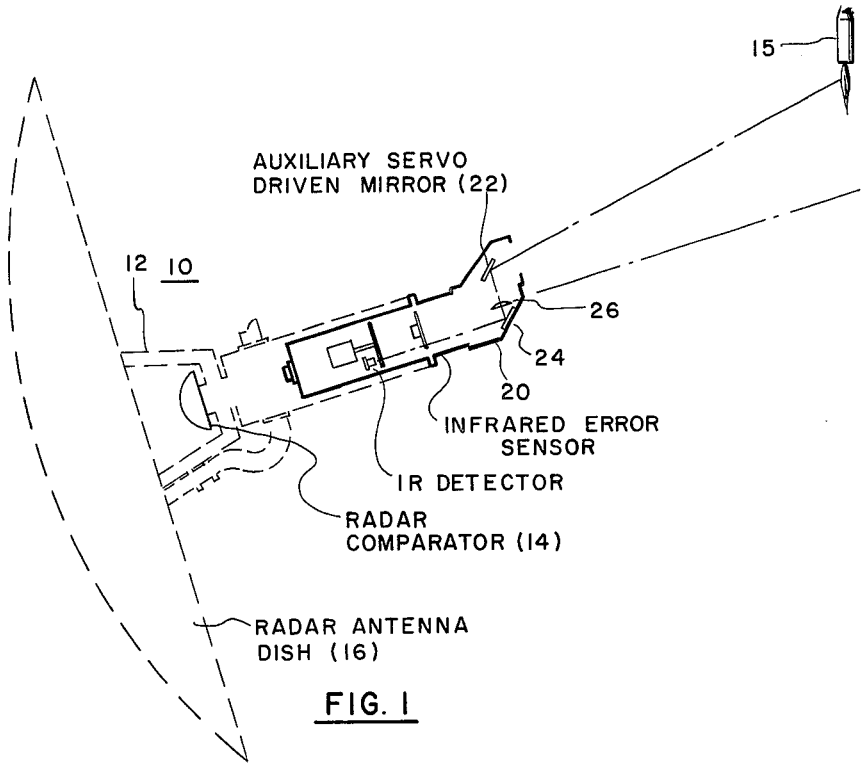

March 22, 1966    R. W. ASTHEIMER    3,242,485
INFRARED ACQUISITION AID FOR A TRACKING SYSTEM
Filed March 30, 1964    2 Sheets-Sheet 1

INVENTOR
ROBERT W. ASTHEIMER
BY Joseph Levinson
ATTORNEY

March 22, 1966  R. W. ASTHEIMER  3,242,485
INFRARED ACQUISITION AID FOR A TRACKING SYSTEM
Filed March 30, 1964  2 Sheets-Sheet 2

INVENTOR
ROBERT W. ASTHEIMER
BY Joseph Levinson
ATTORNEY

United States Patent Office 3,242,485
Patented Mar. 22, 1966

3,242,485
INFRARED ACQUISITION AID FOR A
TRACKING SYSTEM
Robert W. Astheimer, Westport, Conn., assignor to Barnes Engineering Company, Stamford, Conn., a corporation of Delaware
Filed Mar. 30, 1964, Ser. No. 355,854
3 Claims. (Cl. 343—6)

The invention described herein was made in the performance of work under a NASA contract and is subject to the provisions of the National Aeronautics and Space Act of 1958, Public Law 85–568 (72 Stat. 426; 42 U.S.C. 2451), as amended.

This invention relates to tracking systems for following targets moving at high speeds, and more particularly to such systems which use an infrared acquisition aid.

In the tracking of rapidly moving objects such as rockets, missiles, etc., combined infrared-radar tracking systems are often utilized to overcome low-level interference and other problems associated with using radar units alone. In order to avoid duplication and complexity of equipment, it is desirable for infrared and radar trackers to be mounted on the same supports and capable of working the same servo mechanisms for performing the tracking functions. With such a compatible integrated tracking system, switching from one unit to the other might also be simplified. Infrared tracking, of course, is utilized for low-altitude objects and radar for higher altitudes. One of the problems encountered with such compatible systems is that, particularly during launch, the tracker cannot be driven fast enough to follow the high-speed target. If the servo mechanism cannot be driven rapidly enough to bring the target image toward the center of the tracker's field of view, the target will be lost. One solution to the problem would be to provide the infrared tracking unit with a large field of view so that no matter how slow the tracker, the lag between the target and the tracker would not put the target out of the field of view of the infrared sensor. However, such a large field of view is not desirable because it reduces error angle resolution, decreases sensitivity, and increases the background noise of the infrared tracker, all of which may, again, make the system susceptible to the loss of target.

Accordingly, it is an object of this invention to provide a compatible infrared radar tracking system which is capable of tracking high acceleration missiles.

A further object of this invention is to provide an infrared acquisition aid for a radar tracker in which the infrared acquisition aid keeps the target within its field of view and can transfer control to the radar as soon as the radar catches up with the target.

Still a further object of this invention is to provide an infrared acquisition aid for a radar tracking system in which the infrared acquisition aid uses a narrow field of view without losing the target.

In carrying out this invention in an illustrative embodiment thereof, an auxiliary tracking servo system is provided in the elevation axis. The auxiliary servo tracking system is comprised of a servo-driven mirror which is driven by the output of an infrared sensor. The servo-driven elevation mirror offsets the infrared sensor axis from the radar tracking axis, so that the line of sight of the infrared sensor may be deviated. The mirror is held in a normally fixed position, placing the sensor axis parallel with the radar tracking axis but offset therefrom. Since the mirror is very small in mass, it is easily driven at high rates of speed required to follow fast accelerating objects, and will do so until the radar catches up with the object.

Figure 2:
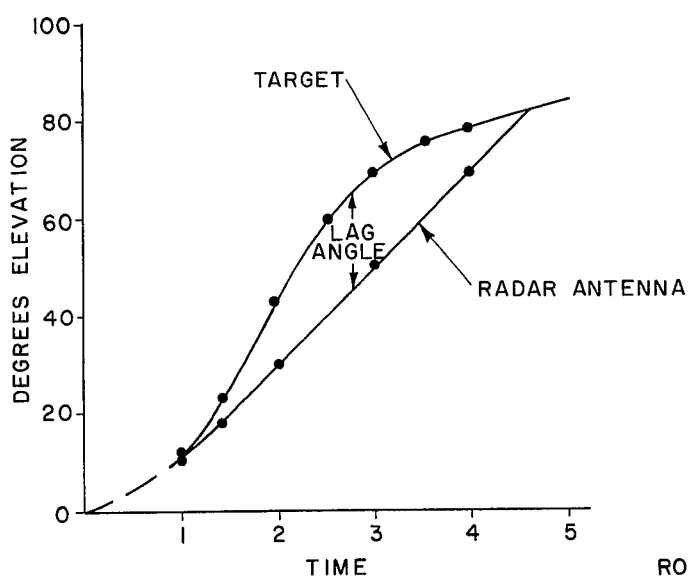
Figure 3:
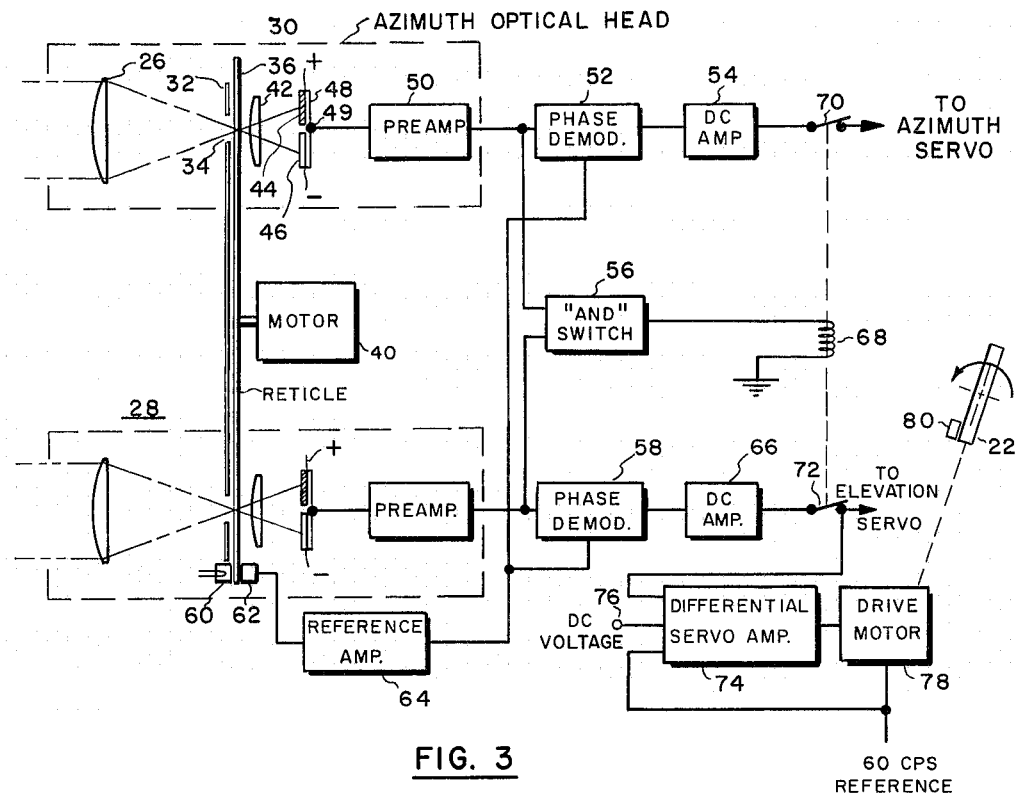
Figure 4:
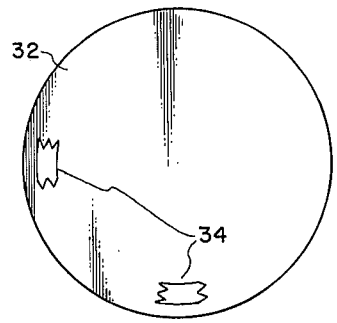
Figure 5:
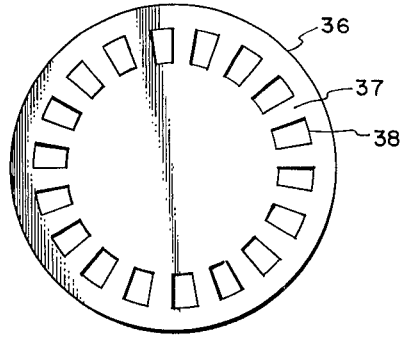

The invention, both as to organization and method of operation, together with further objects and advantages thereof, may best be understood by reference to the following description taken in connection with the accompanying drawing in which:

FIG. 1 shows the infrared acquisition aid including a servo-driven elevation mirror incorporated in and used with a radar tracking system in accordance with this invention, FIG. 2 is a plot of degrees of elevation vs. time which is illustrative of the radar tracking antenna's lag with respect to a type of target which is desired to be tracked, FIG. 3 is a schematic diagram of the infrared acquisition aid as embodied in this invention, FIG. 4 shows a field mask suitable for use in the schematic of FIG. 3, and FIG. 5 shows a chopping reticle suitable for use in the schematic shown in FIG. 3.

As has been pointed out above, one of the problems encountered in tracking fast accelerating targets with relatively sluggish high-precision servo systems such as large radars is that the target can be lost due to the failure of the servo system to attain an acceleration and a velocity which keeps up with the target. FIG. 2 is shown as illustrative of the problem, in which a plot of elevation in degrees vs. time is given for a radar antenna as well as for a type of target which is to be tracked. It is apparent that the lag angle, which is the amount that the radar antenna trails the target, is appreciable. Accordingly, it can be seen that a very large field of view infrared acquisition aid would be required to accommodate the lag angle shown in FIG. 2 in order for the tracking system to accurately track the target. However, such a large field of view is not desirable because it reduces error angle resolution, decreases sensitivity, and increases the background noise of the acquisition aid infrared tracker. These factors could affect the accuracy and reliability of the tracking system, and could also result in the loss of target.

In order to use a narrow field of view, the present invention provides an auxiliary tracking servo system in the elevation axis. As is shown on FIG. 1, the tracking system 10 includes an infrared error sensor 20 mounted on a radar structure 12, which includes a radar comparator 14 and a radar antenna dish 16. Although the invention is not restricted to a particular type of radar, for purposes of disclosure, an AN/FPS–16 radar may be used. This particular type of radar is a monopulse radar which has four receiver horns at the focal plane of the parabolic antenna 16 and determines the target position by comparison of the signals received by opposite pairs of horns. Mounted in front of the infrared error sensor 20 is a servo-driven elevation mirror 22 which directs radiation from the field of view of the sensor through a pair of objective lenses, of which only objective lens 26 is shown, onto a folded mirror 24, and ultimately onto an infrared detector. A more detailed description of the optical and electrical portions of the infrared error sensor will be given in connection with the description of FIG. 3. The elevation mirror 22, which is driven by the output of the infrared error sensor 20, deviates the line of sight of the sensor 20 to overcome the antenna lag while tracking a target 15, which may be a high speed missile. Since the elevation mirror 22 is very small in mass, it can easily be driven at the high rates of speed required to follow a fast accelerating target 15. Furthermore, the lag error for the elevation mirror is so small that it is feasible to use a small field of view for the infrared sensor 20, which is approximately the same extent as the radar beam width.

Before going into a more detailed description of the infrared acquisition aid tracker portion of the system, it should be pointed out that tracking objects by means of their self-emitted infrared radiation presents several aspects substantially different from radar tracking. One of the problems encountered in infrared tracking is that of discriminating the target from its background. For example, weak targets in a bright daylight background are often swamped by the signals from the bright sky background. Although a number of approaches have been utilized for treating this problem, any of which may be employed with the present invention, the present system for illustrative purposes employs spectral ratio discrimination, which is disclosed in an application entitled "Infrared Radiometer With Background Elimination," Serial No. 143,219, by Wormser, Pogoda, and Astheimer, the latter being the inventor of the present application. Spectral ratio discrimination is based on the fact that the spectral distribution of sky background is radically different from that of the plume of the target. Therefore, by sensing the difference in radiation signal received in two properly selected spectral bands, the background signal can be reduced to zero with little loss of target signal.

Referring now to FIG. 3, the infrared acquisition aid tracker includes an azimuth optical head 30 and an elevation optical head 28, which are substantially identical, and accordingly, only the azimuth optical head will be described in detail. The azimuth optical head 30 includes an objective lens 26 which projects an image of the target 15 and the surrounding field through an opening 34 in a field mask 32 (shown in detail in FIG. 4) onto a chopper or coding reticle 36. The coding reticle 36, shown in FIG. 5, includes alternate sectors 37 and 38 which are respectively opaque and transparent to radiation falling thereon. A field lens 42 which is positioned just behind the reticle 36 projects an image of the objective lens 26 onto a bridge detector 48 which may be fabricated of a suitable material such as lead sulfide. The bridge detector has a center electrode 49 which feeds the output of the bridge detector 48 to a preamplifier 50. An infrared filter 44, which may be a slab of germanium, is placed over one half of the detector 48, with a visible filter 46 placed over the remainder. The detector 48, being connected as a bridge, produces a signal proportional to the difference in radiation incident on the two detector elements. To provide for background elimination, the infrared acquisition aid tracker is directed at a bright sky background, and the detector 48 is shifted up or down to reduce the output signal to zero. Since the sky is much brighter in the visible region than in the infrared, the detector 48, positioned for zero sky signal, will be such that the image of the objective lens 26 will fall mostly on the infrared filter 44. Since the target radiation is almost entirely in the infrared region, the detector output will respond to about 90% of the target signal and 0% of the background signal. Accordingly, excellent background rejection is obtained with only a 10% loss in target radiation.

With the target identified in the presence of background radiation, some means must be provided for determining the position of the target within the field of view of the tracker. Proportional elevation and azimuth error signals are used in the present system for controlling a tracking servo mount. The coding reticle 36, which chops the target presented to the detector 48, contains position information which is utilized for providing the elevation and azimuth error signals. The reticle 36 chops the target to produce square wave signals from the detector 48 which are subsequently limited. The opaque sectors 37 and the transparent sectors 38 of the reticle 36 each subtend half of the width of the field mask opening 34, to provide uniform background radiation which remains unmodulated. A reference square wave is generated from the reticle by means of a light source 60 which is periodically detected by a photo pick-up 62 and amplified by a reference amplifier 64. A magnetic type pickup could be used if desired. The target signal supplied from the detector 48 and amplified by the preamplifier 50 is supplied to a phase demodulator 52, as is the reference signal from the reference amplifier 64. The phase demodulator 52 phase detects the signal with respect to the reference signal, to provide a D.C. voltage whose magnitude is proportional to the target position over the central half of the field. The D.C. signal is amplified by a D.C. amplifier 54 and applied to an azimuth servo. Since the reference signal is generated from the same reticle 36 which chops the target, irregularities in the reticle or speed variations of the motor contribute little or no error.

In order to generate elevation and azimuth position information, two identical bore-sighted optical systems 28 and 30 are employed, with their respective field masks spaced 90° apart from each other, as is clearly shown in FIG. 4. The field mask openings 34 are spaced 90° from each other. Separate detectors are used with identical electronic processing, but since the reticle pattern for one is moving at right angles with respect to the other, one detector generates elevation position information while the other detector generates azimuth position information. The elevation optical head 28, which is substantially identical to the azimuth optical head 30, employs the common reticle 36 driven by a common reticle motor 40. Detector signals received therefrom are amplified by a preamplifier and fed to a phase demodulator 58 which is also supplied with a reference signal from the same photo reference amplifier 64. The elevation signals are phase demodulated by the demodulator 58 and applied to a D.C. amplifier 66 and then to an elevation servo of the radar tracker. The azimuth optical head 30 and the elevation optical head 28 are collimated so that each sees the same area in space. Since the azimuth and elevation fields are turned 90° to each other, the field of view used for determining position of the target will be an area where the azimuth and elevation fields of view cross. Signals from the azimuth optical head 30 and the elevation optical head 28 are applied to an AND switch 56 which controls a relay 68 for operating switches 70 and 72. The AND switch 56 operates to require signals from both channels before the tracker feeds error signals to the azimuth and elevation servos.

The auxiliary elevation tracking servo is also shown schematically on FIG. 3. Error signals from the elevation optical head 28, which are fed via switch 72 to the elevation servo of the radar system are also applied to a differential amplifier 74 whose signals are applied to a drive-motor 78 for controlling the elevation track mirror 22. The track mirror 22 is provided with a stop 80 which collimates the elevation track mirror 22 with the radar axis when it is positioned against the stop 80. A 60 c.p.s. reference signal is also applied to the drive motor 78 and to the differential amplifier 74. A D.C. voltage is also applied to terminal 76 of the differential servo amplifier 74 whose magnitude is equivalent to the slew voltage of the elevational mirror servo. Accordingly, the drive motor 78 of the auxiliary elevation track mirror 22 will not drive the mirror 22 until the elevation angle error sensed by the elevation optical head 28 reaches the equivalent slew voltage of the elevation mirror servo. When this lag angle is reached, the auxiliary tracking mirror servo operates to track the target. The mechanism continues to feed slew voltages to the radar elevation servo to enable the radar antenna to catch up with the missile as soon as possible. When the radar antenna 16 does catch up, the auxiliary tracking mirror servo stops operating, although error signals from the infrared sensor 20 are still fed to the radar servos to hold the radar beam on the target 15.

Briefly summarizing the operation again, if the infrared acquisition aid tracker is placed in operation, error signals from the elevation optical head 28 are applied to the differential servo amplifier 74. If no infrared target appears in the field of view, the tracking mirror 22 remains on the stop 80. If an infrared error signal is received, the elevation track mirror 22 remains on the stop 80 as long as the error signal is below the specified angular error or slew voltage for the elevation mirror servo. In other words, the elevation track mirror 22 remains on stop as long as the radar antenna 16 keeps up with the target 15. When the antenna 16 lags the target 15 by an amount exceeding the predetermined angular lag as defined by the D.C. voltage applied to terminal 76, the drive motor 78 has applied thereto a signal which will automatically start the mirror 22 tracking the target. At the same time a slew voltage error signal is also fed to the radar elevation servo to enable the antenna 16 to catch up as soon as possible with the target. As the antenna 16 catches up with the target 15, reducing the lag angle, the tracking mirror 22 decreases in elevation until the radar reaches the minimum D.C. voltage applied to terminal 76, the permissible lag error, at which time the mirror 22 then rests on the stop 80 and the antenna 16 tracks the target 15. The provision of the auxiliary elevation track mirror simply and effectively copes with high acceleration target tracking without compromising the effectiveness of the entire system on lower acceleration targets. This renders the tracker capable of reliably and accurately tracking a wide range of targets having different accelerations and velocities.

The electronic processing circuitry which is employed is considered conventional, and the invention is not considered limited to any specific type of circuits. Merely by way of illustration, the preamplifier may consist of four separate units, the first of which is a linear amplifier with a gain of 5, with the next two units being compression limiting amplifiers in series with small signal gains of 100 each, and the fourth unit having a gain of 10 and also being a compression limiting amplifier. Compression type amplifiers which provide signal limiting are preferred in the present invention, to accommodate large variations in target intensity, and for the primary reason that no track information is carried on the target signal amplitude. In the system described, target position is determined by signal phase only, making a limiting technique simpler and more reliable than amplitude type automatic gain control systems. Phase demodulators such as Barnes EC310 phase-sensitive phase demodulators, and D.C. amplifiers such as Barnes EC410 may be employed. Again, as has already been pointed out, the present invention may be employed with any type of automatic tracking system where a lag problem exists, so it is not considered to be restricted to specific types of tracking systems, radars, electronic processing circuitry, etc.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. A tracking system for accurately tracking targets moving at high speeds and different accelerations comprising
    (a) a radar tracker having a radar tracking axis for following targets,
    (b) an infrared acquisition aid having a narrow field of view and an infrared tracking axis for assisting in the tracking of targets when said radar is ineffective in so doing,
    (c) movable optical means associated with said infrared acquisition aid for offsetting the infrared tracking axis from the radar tracking axis so that the infrared tracking axis is able to move independently of said radar tracking axis,
    (d) means to hold said optical means in a fixed position which position collimates said infrared and radar tracking axes as long as said target is being followed along the radar tracking axis by the radar tracker, and
    (e) means for moving said optical means to track said target along said infrared tracking axis until said radar tracker catches up with said target.

2. The tracking system set forth in claim 1 wherein said movable optical means is a servo driven mirror.

3. An infrared acquisition aid for a radar tracking system for accurately tracking targets moving at high speeds comprising, in combination,
    (a) a radar tracker which includes a radar antenna and tracking servo means for moving the antenna along the radar tracking axis to track a target,
    (b) an infrared error sensor having a narrow field of view for proivding elevation and azimuth error signals in accordance with the target being tracked to control the tracking servo means, and being mounted on said radar tracker,
    (c) a servo-driven elevation mirror offset from the radar tracking axis so that the line of sight of the sensor may be deviated, said mirror being normally held in a fixed stop position until actuated, and
    (d) means to actuate said servo-driven elevation mirror in response to elevation error signals from said sensor when said antenna lags the target by a predetermined amount and to return said mirror to its fixed stop position when said antenna catches up with and tracks said target.

References Cited by the Examiner

UNITED STATES PATENTS 3,025,515   3/1962   Fairbanks.
3,108,270   10/1963  Fairbanks.

CHESTER L. JUSTUS, *Primary Examiner.*